Figure 1:
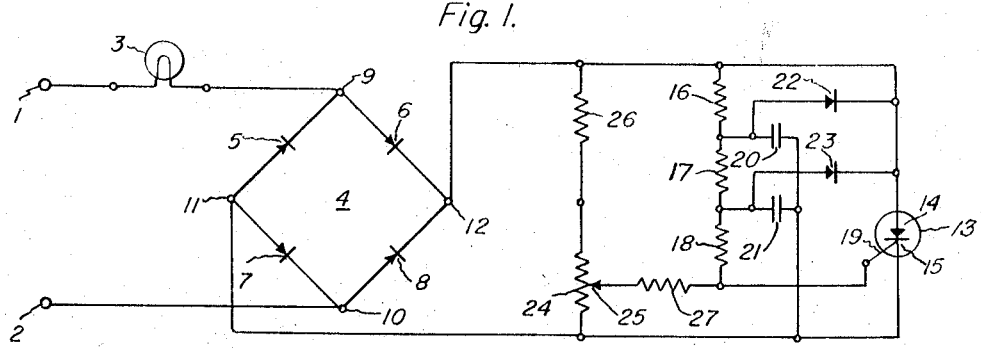

Dec. 13, 1966          J. J. TIEMANN          3,292,007

FULL-WAVE DIMMER CIRCUIT USING ONE CONTROLLED RECTIFIER

Filed Oct. 17, 1963

Inventor:
Jerome J. Tiemann,
by John F. Ahern
His Attorney.

United States Patent Office 3,292,007
Patented Dec. 13, 1966

3,292,007
FULL-WAVE DIMMER CIRCUIT USING ONE CONTROLLED RECTIFIER
Jerome J. Tiemann, Burnt Hills, N.Y., assignor to General Electric Company, a corporation of New York
Filed Oct. 17, 1963, Ser. No. 316,948
3 Claims. (Cl. 307—88.5)

The present invention relates to power regulators and more particularly pertains to such regulators using controlled rectifiers.

It is frequently desirable to control the quantity of alternating current power supplied to various power consuming devices including incandescent lamps, heating elements and the like. Preferably, the power supplied to such devices is smoothly controllable over the wide range from almost zero power to full power.

A power regulator capable of continuously controlling the alternating current input power to a power utilizing device over the wide range from approximately "off" to about full power input is referred to oftentimes in the art as possessing substantially 100% control. There is a vast variety of power regulators which achieve about 100% control, many of which utilize a plurality of controlled rectifiers and firing circuits therefor which employ active elements, as unijunction and other types of transistors.

Controlled rectifiers are relatively expensive articles and it is highly desirable to provide an alternating current power regulator having substantially 100% control and requiring only a single controlled rectifier unit. Also, for economic reasons, it is desirable to obviate transistors or other controllably conductive elements in the control circuit for the controlled rectifier.

Accordingly, it is an object of this invention to provide an alternating current power regulator having substantially 100% control and requiring only a single controlled rectifier.

Another object of this invention is to provide an alternating current power regulator having substantially 100% control and requiring only a single controlled rectifier with a control circuit therefor constituted solely of diodes, resistors and capacitors.

Briefly, in accordance with a preferred embodiment of the present invention a source of alternating current power is connected to opposed junctions of a diode bridge circuit through an electrical device to be energized, and a controlled rectifier is connected between opposite opposed terminals of the bridge. Thus, the controlled rectifier is supplied from a source of unidirectional pulsating, or full-wave rectified, voltage. The point in time during each half cycle at which the controlled rectifier starts to conduct determines the quantity of power supplied to the electrical device. The control circuit for the controlled rectifier comprises an integrating network constituted of a plurality of capacitors and resistors connected from the anode of the controlled rectifier to the gating electrode thereof. Asymmetrically conducting devices are connected to the capacitors of the integrating network to provide low impedance discharge paths therefor when the controlled rectifier becomes conductive. Variable resistance means are connected directly or through an appropriate impedance to the gating electrode of the controlled rectifier and vary inversely the resistance of separate electrical paths therefrom to the anode and cathode of the controlled rectifier, respectively, providing means for selectively varying the conduction angle of the controlled rectifier and providing a regulator having substantially 100% control.

Figure 2:
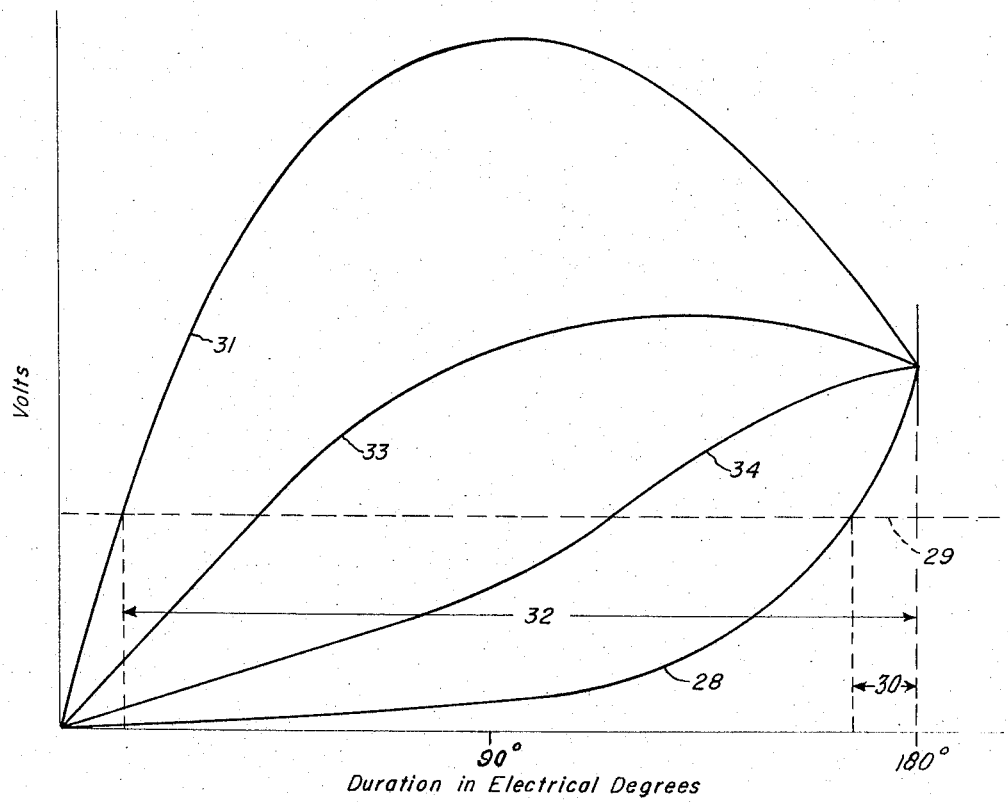

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which:

FIGURE 1 is a schematic circuit diagram of the preferred embodiment of my invention; and FIGURE 2 illustrates voltage waveforms in the control portion of the circuit of FIGURE 1.

If a regulator capable of achieving nearly 100% control of alternating current power is to be constructed by utilizing a conventional controlled rectifier, which can control only one polarity of current, it is necessary to provide some arrangement for converting the alternating current to pulsating unidirectional current. To this end, I prefer to utilize a full-wave bridge rectifier circuit.

A principal difficulty to which the present invention is addressed lies in providing a control circuit for the controlled rectifier that will enable the device to fire, or become conductive, late in the cycle to allow small amounts of power to be supplied to the electrically energized apparatus. Prior attempts to utilize inexpensive resistance-capacitance integrating networks for this purpose have failed because the capacitors remain substantially fully charged after conduction is initiated, and remain so into the succeeding power cycle, resulting in loss of control. Thus, a primary problem overcome by practice of the present invention is to achieve small conduction angles for controlled rectifiers, used in conjunction with a source of unidirectional pulsating power, by means of a resistance-capacitance integrating network.

FIGURE 1 illustrates schematically a voltage regulator comprising input terminals 1 and 2, which are adapted to be connected to a source of alternating current power, as the readily available commercial power (117 volts at 60 cycles per second). Connected in series across terminals 1 and 2 are an electrically energizable apparatus 3, which may be an incandescent bulb as illustrated, and a diode bridge network 4.

Bridge 4 is comprised of diodes 5, 6, 7 and 8. The anode of diode 6 and the cathode of diode 5 are joined at junction 9, which is connected to electrical apparatus 3. The cathode of diode 7 and the anode of diode 8 are connected together at junction 10 and connected to terminal 2. Thus, junctions 9 and 10 are opposed terminals of bridge 4. Opposite opposed terminals of bridge 4 consist of junctions 11 and 12. Junction 11 is the connection between the anodes of diodes 5 and 7 and junction 12 is the connection between the cathodes of diodes 6 and 8.

Operation of the circuit thus far described is as follows. When terminal 1 is positive with respect to terminal 2 diode 5 is blocking, or biased in the reverse direction wherein there is no substantial electric current therethrough. Diode 6 is biased to be conductive, but diode 8 opposes conduction in this leg of bridge 4, resulting in no current through electrical apparatus 3. Similiarly, when terminal 1 is negative with respect to terminal 2, diodes 7 and 6 block the current and electrical apparatus 3 is not energized.

Assuming that an electrically conductive device is connected from junction 12 to junction 11 and permits current in the direction from junction 12 to junction 11, electrical apparatus 3 is energized during both positive and negative alternations of the source of power. This occurs because when terminal 1 is positive with respect to terminal 3 current flows through diode 6, from junction 12 to junction 11, and through diode 7 back to terminal 2. Similarly, when terminal 1 is negative with respect to terminal 2 current flows through diode 8, from junction 12 to junction 11, and through diode 5 back to terminal 1 through electrical apparatus 3. Thus, means which control the amount or duration of current from junction 12 to junction 11 exercise corresponding control on the current through electrical apparatus 3. It is such means to which the present invention is addressed, and for purposes of the description thereof and in the appended claims such means will be referred to as connected to a source of unidirectional pulsating power, which in fact characterizes the electrical power supplied from junctions 12 and 11.

In accordance with the present invention a controlled rectifier 13 includes an anode 14 and a cathode 15 connected to junctions 12 and 11, respectively. A control circuit is provided for selectively varying the duration of conduction, or conduction angle, of controlled rectifier 13 to exercise a corresponding control over the current through electrical apparatus 3.

By the term "controlled rectifier" it is intended to designate any of a plurality of asymmetrically conducting electrical devices, such as the PNPN switch, that remain nonconductive until a particular electrical signal is received at a low current control electrode thereof, commonly referred to as a gating electrode. Thereafter, the controlled rectifier remains conductive until the current from the anode to the cathode thereof falls below a critical value called the minimum holding current.

The conduction angle of a controlled rectifier is dependent upon the instant of time at which the controlled rectifier becomes conductive, with relation to the initiation or start of any given power cycle. In the case of full-wave rectified sinusoidal voltages, one complete half cycle is considered to contain 180°. Thus, a controlled rectifier which becomes conductive during one-half of each half cycle is said to have a conduction angle of 90°. Similarly, a controlled rectifier which conducts for one-quarter or three-quarters of each half cycle is referred to as having a conduction angle of 45° and 135°, respectively.

Variations in the conduction angle cause changes in the same direction in the power through the controlled rectifier. Therefore, when controlled rectifier 13 has a large conduction angle electrical apparatus 3 is supplied with a relatively large quantity of electrical power. Conversely, when the conduction angle of controlled rectifier 13 is small, the corresponding power supplied to electrical apparatus 3 is likewise small.

The circuit by which the conduction angle of controlled rectifier 13 is varied to provide corresponding changes in the power supplied to electrical apparatus 3 will now be described. The control circuit for controlled rectifier 13 includes an integrating network including at least three resistors 16, 17 and 18 connected in series circuit relationship from anode 14 to the gating electrode 19, of controlled rectifier 13, and capacitors 20 and 21 connected from the junctions of resistors 16 and 17 and 17 and 18, respectively, to cathode 15 of controlled rectifier 13. Of course, resistors 16, 17 and 18 could equally well be a single resistor having a plurality of taps disposed intermediate the ends thereof and capacitors 20 and 21 could equally well be a single dual capacitor, particularly since the two capacitors share a common terminal.

The purpose for the integrating network is to provide a voltage having a steeply rising waveform, near the end of the half cycle, that can be supplied to gating electrode 19. Such a voltage permits more precise control of the time when initiation of conduction in SCR 13 occurs than is obtainable by using slowly rising, relatively flat-topped waveform, control voltages.

The maximum duration of effective integration of a half cycle that is obtainable with any one resistance-capacitance pair is about 90°. Thereafter the waveform slope decreases. Because the regulator of the present invention is to achieve substantially 100% control, it is evident that a plurality of resistance-capacitance pairs are required, in order to achieve a steep waveform voltage to provide precise control of conduction angles less than 90°.

A primary feature of the present invention is the means by which capacitors 20 and 21 are discharged, after their function has been completed in any given cycle, and prepared to perform their roles in the next succeeding cycle. To this end, asymmetrically conducting devices, which may be diodes 22 and 23 as illustrated schematically, are connected from the junctions of resistors 16 and 17 and resistors 17 and 18, respectively, to anode 14 of controlled rectifier 13. In this way, when controlled rectifier 13 becomes conductive during any given power cycle, capacitors 20 and 21 are discharged through diodes 22 and 23, respectively, and the low impedance of controlled rectifier 13.

Diodes 22 and 23 do not conduct prior to initiation of conduction in controlled rectifier 13 because the cathodes thereof, which are connected to anode 14 of controlled rectifier 13, are positively biased with respect to the anodes thereof, which are connected to the aforementioned junctions of the resistors 16, 17 and 18. Thus, diodes 22 and 23 isolate the integration network during the portion of the cycle wherein controlled rectifier 13 is not conductive and thereafter provide a discharge path for capacitors 20 and 21, preparing the integration network for the next succeeding cycle of operation.

In order to control the conduction angle of controlled rectifier 13, I provide resistive means connected to anode 14, cathode 15 and gating electrode 19 that provides resistive electrical paths from anode 14 and cathode 15, respectively, to gating electrode 19. The resistive means is controllable to selectively vary the magnitude of resistance of the two paths in opposite directions to provide a corresponding variation in the conduction angle of the controlled rectifier. In FIGURE 1 the resistive means takes the form of a resistor 24, having a variable tap 25 thereon, that is connected in series electrical relationship with resistor 26 from cathode 15 to anode 14. Adjustable tap 25, of resistor 24, is connected to gating electrode 19 by resistor 27.

The resistive path between anode 14 and gating electrode 19 is constituted of resistor 26, one portion of resistor 24 determined by the position of tap 25, and resistor 27. The resistive path from cathode 15 to gating electrode 19 includes the other portion of resistor 24 and resistor 27. As tap 25 is adjusted upwardly, reducing resistance in the path from anode 14 to gating electrode 19, the resistance in the path from cathode 15 to gating electrode 19 is concomitantly increased. Conversely, adjustment of tap 25 in the direction to increase the resistance from anode 14 to gating electrode 19 simultaneously decreases the resistance from cathode 15 to gating electrode 19.

Operation of the control circuit in FIGURE 1 is as follows. Assuming that tap 25 is adjusted to the extreme position wherein the resistance from cathode 15 to gating electrode 19 is a minimum, and equal only to the resistance value of resistor 27, the total electric power supplied to gating electrode 19 is delivered through the integration network. By properly selecting the resistance-capacitance values of the integration network the conduction angle of controlled rectifier 13 under such conditions is made extremely low. Typical values are in the order of from 5° to 20°. Thus, controlled rectifier 13 is substantially nonconductive and little power is supplied to electrical apparatus 3, as discussed before.

As tap 25 on resistor 24 is moved in the direction to increase the resistance in the path from cathode 15 to gating electrode 19, electric power delivered through the path including resistor 26 assumes an increasing role in the control of controlled rectifier 13. The electric power supplied through the latter path is substantially the same, in time relationship, to the voltage between anode 14 and cathode 15 of controlled rectifier 13, and, in the absence of the integration network, would initiate conduction of controlled rectifier 13 early in the power cycle, resulting in a very large conduction angle.

The result of the composite control signal comprised of power supplied through the integration network and power supplied through the path including resistor 26, is to establish a conduction angle intermediate the two extreme conditions that depends upon the relative strength of the two components of the composite signal. The relative strengths of the components of the composite signal are determined by the position of tap 25 on resistor 24. Thus, the position of tap 25 on resistor 24 determines the conduction angle of controlled rectifier 13 between a very small value, when the resistance between cathode 15 and gating electrode 19 is at a minimum, to a condition wherein the conduction angle is very large, when the resistance between cathode 15 and gating electrode 19 is maximized. In this way, substantially 100% regulation of the power supplied to electrical apparatus 3 is achieved by adjustment of tap 25.

FIGURE 2 is a graph of control voltage versus duration of a half cycle and clearly illustrates the aforementioned effect of mixing the integrated voltage and the half cycle voltage supplied to anode 14 of SCR 13. Curve 28 represents the control voltage when there is no mixing, or adding, of the half cycle voltage to the integrated voltage. Dashed line 29 represents the magnitude of control voltage at which SCR 13 fires, or becomes conductive. Thus, SCR 13 fires late in the cycle, resulting in a small conduction angle 30. Curve 31 represents the control voltage when the maximum magnitude of half cycle voltage is mixed with the integrated voltage to achieve early firing of SCR 13 and a maximum conduction angle 32. Curves 33 and 34 represent intermediate conditions of mixing the half cycle voltage with the integrated voltage. Thus, resistors 26 and 27 and variable resistance 24 can be considered as means for mixing a variable portion of the voltage supplied to anode 14 with the integrated voltage to provide a corresponding variation in the conduction angle of SCR 13.

The following specific components have been found to yield a particularly desirable power regulator in accordance with my invention, and are given merely for the purpose of aiding those skilled in the art in the practice of my invention and are not to be considered in a limiting sense:

Diodes 5, 6, 7 and 8, each type 1N2850
Diodes 22 and 23, each type 1N1693
Controlled Rectifier 13, type C11B
Resistors 17, 18 and 26, 2,700 ohms
Resistor 16, 620 ohms
Variable Resistor 24, 2,500 ohms
Resistor 27, 1,000 ohms
Capacitors 20 and 21, 5 microfarads, 200 volt The above-mentioned specific regulator in accordance with my invention provides smooth control of the power supplied to a resistive electrical apparatus from a maximum full power value of about 500 watts down to about 1% of full power. Of course, other ratings are readily obtained by using differently rated components. Thus, an alternating current power regulator is provided using only a single controlled rectifier and a control circuit therefor constituted only of resistors, capacitors and diodes.

While only preferred features of the invention have been shown by way of illustration, many modifications and changes will occur to those skilled in the art. For example, the electrical apparatus which is to be variably energized in accordance with the present invention can be energized equally advantageously in many cases by unidirectional pulsating power instead of alternating current power. This may be readily accomplished by connecting the apparatus in series in the cathode circuit of the controlled rectifier. It is, therefore, to be understood that the appended claims are intended to cover this and all such other modifications and changes as fall within the true spirit and scope of my invention.

What I claim as new and desire to secure by Letters Patent of the United States is:

1. A control circuit for selectively varying the conduction angle of a controlled rectifier having an anode, a cathode and a gating electrode, said anode and cathode being adapted to be connected to a source of pulsating unidirectional voltage; said control circuit comprising: an integration network including at least three resistors connected in series circuit relationship from said anode to said gating electrode and capacitors connected from the junctions of said resistors to said cathode; asymmetrically conducting devices connected from the junctions of said resistors to said anode, said devices being connected to provide low impedance discharge paths for said capacitors through said rectifier when conduction of said rectifier is initiated; and, means connected to said anode and said gating electrode for mixing a variable portion of the voltage supplied to said anode with the voltage from said integrating network to provide a corresponding variation in the conduction angle of said rectifier.

2. A control circuit for selectively varying the conduction angle of a controlled rectifier having an anode, a cathode and a gating electrode, said anode and cathode being adapted to be connected to a source of pulsating unidirectional voltage; said control circuit comprising: an integrating network including at least three resistors connected in series circuit relationship from said anode to said gating electrode and capacitors connected from the junctions of said resistors to said cathode; asymmetrically conducting devices connected from the junctions of said resistors to said anode, said devices being connected to provide low impedance discharge paths for said capacitors through said rectifier when conduction of said rectifier is initiated; and, resistive means connected to said rectifier anode, cathode and gate electrode and providing resistive electrical paths from said anode and cathode, respectively, to said gating electrode, said resistive means being controllable to selectively vary the magnitude of resistance of said paths in opposite directions to provide a corresponding variation in the conduction angle of said rectifier.

3. The control circuit of claim 2 wherein said resistive means comprises first and second resistors connected from said anode to said cathode, said second resistor having a variable tap thereon connected by a resistor to said gating electrode.

References Cited by the Examiner

UNITED STATES PATENTS

| Re. 25,203 | 7/1962 | Momberg et al. | 318—246 |
|---|---|---|---|
| 3,103,618 | 9/1963 | Slater | 323—22 |
| 3,218,511 | 11/1965 | Rosenbaum | 315—207 |
| 3,223,918 | 12/1965 | Kalns et al. | 320—39 |

JOHN F. COUCH, *Primary Examiner.*

W. E. RAY, *Assistant Examiner.*